(12) United States Patent
Fujisawa

(10) Patent No.: US 10,036,431 B2
(45) Date of Patent: Jul. 31, 2018

(54) ELECTROMAGNETIC CLUTCH

(71) Applicant: OGURA CLUTCH CO., LTD., Kiryu-shi Gunma (JP)

(72) Inventor: Yoshinori Fujisawa, Kiryu-shi Gunma (JP)

(73) Assignee: OGURA CLUTCH CO., LTD., Kiryu-shi, Gunma (JP)

( * ) Notice: Subject to any disclaimer, the term of this patent is extended or adjusted under 35 U.S.C. 154(b) by 219 days.

(21) Appl. No.: 15/260,063

(22) Filed: Sep. 8, 2016

(65) Prior Publication Data

US 2017/0067516 A1    Mar. 9, 2017

(30) Foreign Application Priority Data

Sep. 9, 2015 (JP) .................................. 2015-177261
Aug. 30, 2016 (JP) .................................. 2016-167676

(51) Int. Cl.
| | |
|---|---|
| *F16D 27/02* | (2006.01) |
| *F16D 27/14* | (2006.01) |
| *F16D 27/112* | (2006.01) |
| *F16D 27/00* | (2006.01) |

(52) U.S. Cl.
CPC ............ *F16D 27/02* (2013.01); *F16D 27/112* (2013.01); *F16D 27/14* (2013.01); *F16D 2027/007* (2013.01)

(58) Field of Classification Search
None
See application file for complete search history.

(56) References Cited

U.S. PATENT DOCUMENTS

| | | | | |
|---|---|---|---|---|
| 4,704,554 A | * | 11/1987 | Nishimura | ............ F16D 27/105 192/35 |
| 5,361,883 A | * | 11/1994 | Yamamoto | ............ F16D 27/112 192/84.961 |
| 5,762,173 A | * | 6/1998 | Nishimura | ............ F16D 27/112 192/110 R |

(Continued)

FOREIGN PATENT DOCUMENTS

| | | |
|---|---|---|
| EP | 0836076 A2 | 4/1998 |
| EP | 0841497 A2 | 5/1998 |

(Continued)

OTHER PUBLICATIONS

Search Report in European Patent Application No. 16187456.5 dated Feb. 24, 2017. 8 pages.

*Primary Examiner* — Colby M Hansen
(74) *Attorney, Agent, or Firm* — Womble Bond Dickinson (US) LLP

(57) ABSTRACT

An electromagnetic clutch includes an armature to be attracted to a rotor, an armature hub formed on one end portion of a rotating shaft, and a leaf spring which connects the armature to the armature hub and biases the armature away from the rotor. The leaf spring includes a base fixed to the armature hub, a stopper connected to the base, and a connecting piece surrounding the stopper by projecting outside from the base, and fixed to the armature. A through hole into which a rivet for fixing the base to the armature hub is inserted is formed in the base. A low-strength portion having strength lower than that in the periphery of the through hole is formed in a boundary portion between the base and a connecting portion.

4 Claims, 4 Drawing Sheets

(56) References Cited

U.S. PATENT DOCUMENTS

| | | | | |
|---|---|---|---|---|
| 5,791,039 | A | * | 8/1998 | Tabuchi ................ F16D 27/112 |
| | | | | 192/84.31 |
| 5,924,537 | A | * | 7/1999 | Tobayama ............ F16D 27/112 |
| | | | | 192/84.96 |
| 2004/0016617 | A1 | | 1/2004 | Imai et al. |
| 2011/0127136 | A1 | * | 6/2011 | Sakuraba ............. F16D 27/112 |
| | | | | 192/66.31 |

FOREIGN PATENT DOCUMENTS

| JP | S61-037862 Y | 11/1986 |
|---|---|---|
| JP | H 1054476 A | 2/1998 |

* cited by examiner

ELECTROMAGNETIC CLUTCH

BACKGROUND OF THE INVENTION

The present invention relates to an electromagnetic clutch including a leaf spring having a function of causing an armature hub to support an armature while biasing the armature away from a rotor, and a function of regulating the movement of the armature in a non-excited state.

A related electromagnetic clutch is disclosed in Japanese Utility Model Publication No. 61-37862 (literature 1). This electromagnetic clutch includes an annular rotor as an input-side rotary member. A field having an electromagnetic coil is inserted inside the rotor. An input shaft of a device to be driven is inserted into the axial portion of the rotor. An armature hub is formed on a distal end portion of the input shaft. A leaf spring extending in the radial direction of the rotor is fixed to the armature hub by rivets.

An armature is fixed to the end portion of the leaf spring on the outside of the rotor in the radial direction. The leaf spring biases the armature away from the rotor. The armature is formed into an annular shape when viewed in the axial direction of the input shaft. The armature is supported by the armature hub via the leaf spring, thereby being held in a position facing the end face of the rotor in the axial direction. When the electromagnetic coil is excited, the armature is magnetically attracted to the rotor against the spring force of the leaf spring.

The leaf spring includes an annular main body having an annular shape when viewed in the axial direction of the above-described input shaft, and a stopper projecting inside the annular main body. The annular main body is formed into a non-circular shape which is axially symmetrical with respect to a virtual central line extending in the radial direction of the rotor, when viewed in the axial direction of the input shaft. The annular main body includes a proximal end portion intersecting the virtual central line inside the rotor in the radial direction, and a free end portion intersecting the virtual central line inside the rotor in the radial direction. The proximal end portion is fixed to the armature hub by a rivet. The free end portion is fixed to the armature by a rivet.

The stopper includes a tongue projecting from the proximal end portion to the free end portion of the annular main body. Stopper rubber member is formed at the distal end portion of the tongue. When power supply to the electromagnetic coil is stopped in this related electromagnetic clutch, the armature is separated from the rotor by the spring force of the leaf spring, and abuts against the stopper rubber member and stops.

Since the stopper rubber member is formed in the stopper of the leaf spring, the outside dimension (outer diameter) of a flange of the armature hub in the radial direction can be made smaller than the inside dimension (inner diameter) of the armature in the radial direction. Consequently, an inexpensive lightweight electromagnetic clutch can be provided.

In this related electromagnetic clutch, however, if the input shaft of the device to be driven is locked by some cause, the armature may fall outside the electromagnetic clutch when power supply to the electromagnetic clutch is stopped. This is probably caused by the structure of the leaf spring as will be explained below.

When the input shaft is locked, an excess load is applied to the proximal end portion of the leaf spring and stress concentrates thereto, and cracking occurs in the periphery of a rivet hole of the proximal end portion. Then, the proximal end portion of the leaf spring is broken in the periphery of the rivet hole, and comes off the armature hub. Therefore, the proximal end portion of the leaf spring leaves the armature hub immediately after the input shaft is locked, and the armature and leaf spring rotate together with the rotor. After that, the armature and leaf spring leave the rotor when power supply to the electromagnetic clutch is stopped. Since, however, the outer diameter of the flange of the armature hub is smaller than the inner diameter of the armature, the armature is not supported by the flange of the armature hub. Consequently, the armature and leaf spring are spun off and fall outside the electromagnetic clutch as described above.

As described above, an inexpensive lightweight electromagnetic clutch can be provided by forming the stopper rubber member in the stopper of the leaf spring. On the other hand, if the proximal end portion of the leaf spring is broken in the periphery of the rivet hole, the rotating armature and leaf spring may be spun off and fall outside the electromagnetic clutch.

SUMMARY OF THE INVENTION

It is, therefore, an object of the present invention to provide an electromagnetic clutch which prevents an armature from falling outside the electromagnetic clutch even when a leaf spring is broken by the application of an excess load.

To achieve this object according to the present invention, there is provided an electromagnetic clutch including a first rotary member formed of a magnetic material; a second rotary member arranged in an axial portion of the first rotary member, and rotatable with respect to the first rotary member; an armature hub including a boss formed on one end portion of the second rotary member in an axial direction, and a flange extending outside in a radial direction from the boss; an armature formed into an annular shape including a hollow portion having a diameter larger than an outer diameter of the flange, and arranged in a position facing one end portion of the first rotary member in the axial direction, the flange being inserted into the hollow portion; a leaf spring configured to connect the armature to the flange, and bias the armature away from the first rotary member by a spring force; an electromagnetic coil configured to generate a magnetic flux, and magnetically attract the armature to the first rotary member against the spring force of the leaf spring; a first rivet configured to fix the leaf spring to the flange; and a second rivet configured to fix the leaf spring to the armature, wherein the leaf spring includes a base formed into an annular shape, positioned on the same axis as that of the second rotary member, and overlaid on and fixed to the flange, a first through hole which is formed in the base, and into which the first rivet is inserted, a stopper projecting outside in the radial direction from a portion, in which the first through hole is formed, of an outer circumferential portion of the base and facing the armature in the axial direction, a connecting piece including a pair of connecting portions projecting outside in the radial direction from two sides of the stopper on an outer circumferential portion of the base, and having distal ends connected to each other, a second through hole which is formed in a projecting end of the connecting piece, and into which the second rivet is inserted, a punched hole formed between the connecting piece and the stopper outside the base in the radial direction, and a low-strength portion formed in a boundary portion between the base and the connecting portion and having strength lower than that in a periphery of the first through hole, the boundary portion overlapping an outer circumferential edge of the flange when viewed in an axial direction of the second rotary member.

DESCRIPTION OF THE PREFERRED EMBODIMENTS

Figure 1:
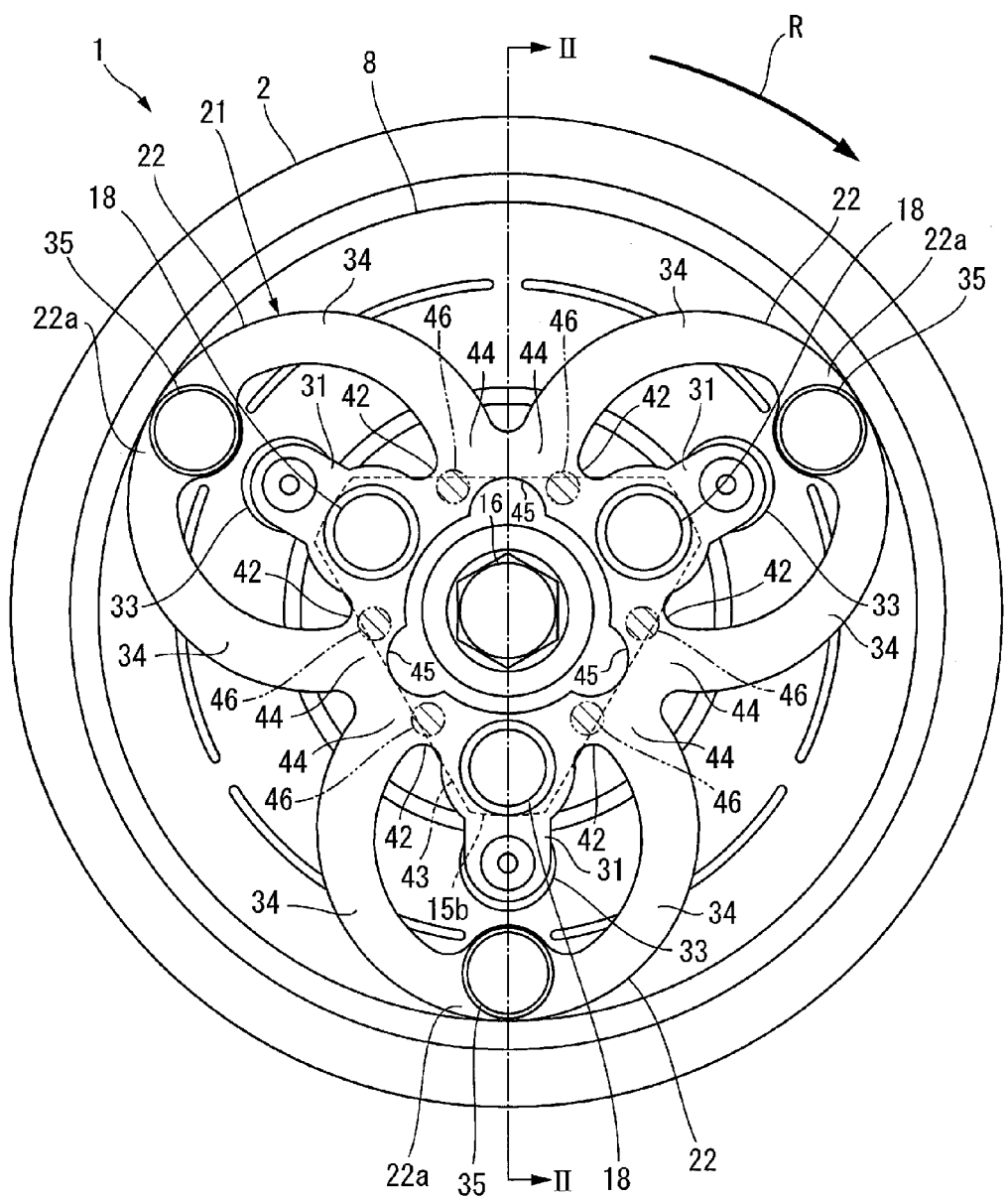
FIG. 1 is a front view of an electromagnetic clutch as an embodiment of the present invention.

An electromagnetic clutch as an embodiment of the present invention will be explained in detail below with reference to FIGS. 1 to 3. An electromagnetic clutch 1 shown in FIG. 1 switches a connected state in which the rotation of a rotor 2 depicted on the outermost side in FIG. 1 is transmitted to a rotating shaft 3 (see FIG. 2) arranged in the axial portion of the rotor 2, and a disconnected state in which this power transmission is interrupted.

The rotor 2 is formed into an annular shape by using a magnetic material, and rotatably supported in a front housing 6 of a car air-conditioner compressor 5 by a bearing 4 fitted in the inner circumferential portion of the rotor 2. A cylindrical portion 7 projects from one end portion of the front housing 6. The above-described bearing 4 is formed on the cylindrical portion 7. In the following explanation, a direction (rightward in FIG. 2) in which the cylindrical portion 7 projects from the front housing 6 is frontward of the electromagnetic clutch 1, and a direction opposite to this direction is backward thereof.

A pulley groove 2a around which a power transmission belt (not shown) is wound is formed in the outer circumferential portion of the rotor 2. In this embodiment, the rotor 2 forms "a first rotary member" of the present invention, and the rotating shaft 3 forms "a second rotary member" of the present invention. A friction surface 2b which comes in contact with a friction surface 8a of an armature 8 (to be described later) is formed on the front end (one end portion in the axial direction) of the rotor 2.

Also, an annular groove 9 which opens backward is formed in the rotor 2. A field 10 is inserted inside the groove 9. The field 10 includes an annular yoke 12 having a recessed groove 11 which opens frontward, and an electromagnetic coil 14 accommodated in the recessed groove 11 of the yoke 12 and fixed by an insulating resin 13. The yoke 12 is fixed to the front housing 6.

The rotating shaft 3 is rotatably supported in the front housing 6, and rotatable with respect to the rotor 2. As shown in FIG. 2, the front end portion (one end portion in the axial direction) of the rotating shaft 3 is accommodated in the cylindrical portion 7 of the front housing 6. The above-described rotor 2 is positioned on the same axis as that of the rotating shaft 3. A relatively thin splined portion 3a is formed in the front end portion of the rotating shaft 3. An armature hub 15 is fitted on the splined portion 3a. The armature hub 15 includes a cylindrical boss 15a which fits on the splined portion 3a by splining (not shown), and a flange 15b extending outside in the radial direction from the front end portion of the boss 15a.

The boss 15a is pushed backward by a fixing bolt 16 threadably engaged with the front end portion of the rotating shaft 3, and pushed against a step 3b as the rear end portion of the splined portion 3a via a shim 17. The armature hub 15 is fixed to the rotating shaft 3 by the fixing bolt 16 by thus threadably engaging the fixing bolt 16 with the rotating shaft 3. The shim 17 is a part for adjusting an air gap G between the rotor 2 and the armature 8. As indicated by the broken lines in FIG. 1, the flange 15b of the armature 15 is formed into an almost triangular shape when viewed frontways. A leaf spring 21 is fixed to the three corners of the flange 15b by base-side rivets 18 (to be described later).

The leaf spring 21 connects the armature 8 to the armature hub 15, thereby supporting the armature 8 by the armature hub 15. The armature 8 is formed by an annular plate made of a magnetic material. The armature 8 has a hollow portion. The diameter (the inside dimension of the armature 8 in the radial direction) of the hollow portion is larger than the outer diameter (the outside dimension of the flange 15b in the radial direction) of the flange 15b of the armature hub 15. The armature 8 is arranged in a position facing the front end of the rotor 2 with the flange 15b of the armature hub 15 being inserted into the hollow portion.

The structure of the leaf spring 21 will be explained in more detail. As shown in FIG. 3, the leaf spring 21 has three annular connecting pieces 22. The connecting pieces 22 are integrated with an annular base 23 so as to surround it. The three connecting pieces 22 are formed in positions which divide the outer circumferential portion of the annular base 23 into three equal parts in the circumferential direction, and extend outside in the radial direction from the outer circumferential portion of the base 23. That is, the connecting pieces 22 are formed along three virtual central lines C1 to C3 extending in the radiation direction at the positions which divide the base 23 into three equal parts in the circumferential direction.

Three through holes 24 are formed in portions intersecting the virtual central lines C1 to C3 in the base 23. Accordingly, the through holes 24 are arranged apart from each other in the circumferential direction of the base 23. The above-described base-side rivets 18 are inserted into the through holes 24. The base-side rivets 18 are inserted into the through holes 24 and through holes 25 (see FIG. 2) formed in the flange 15b of the armature hub 15 and caulked. That is, the base-side rivets 18 connect the flange 15b of the armature hub 15 and the base 23 of the leaf spring 21. Note that a shim 26 shown in FIG. 2 can be sandwiched between the base 23 and the flange 15b. The base 23 of the leaf spring 21 is positioned on the same axis as that of the rotating shaft 3 by being overlaid on and fixed to the flange 15b of the armature hub 15 by the base-side rivets 18. In this embodiment, the base-side rivet 18 is "a first rivet" of the present invention.

Figure 2:
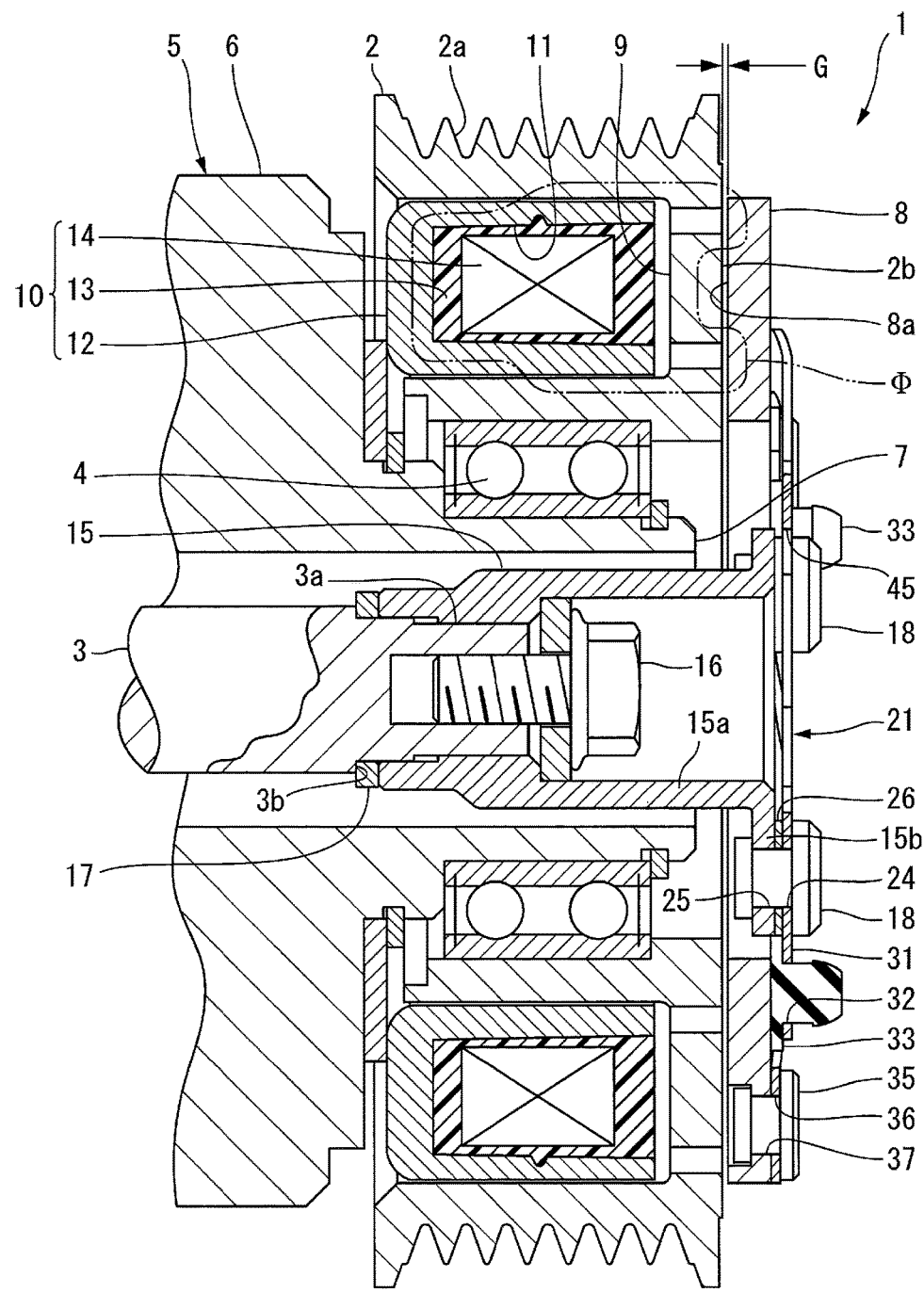
FIG. 2 is a sectional view taken along a line II-II in FIG. 1.
Figure 3:
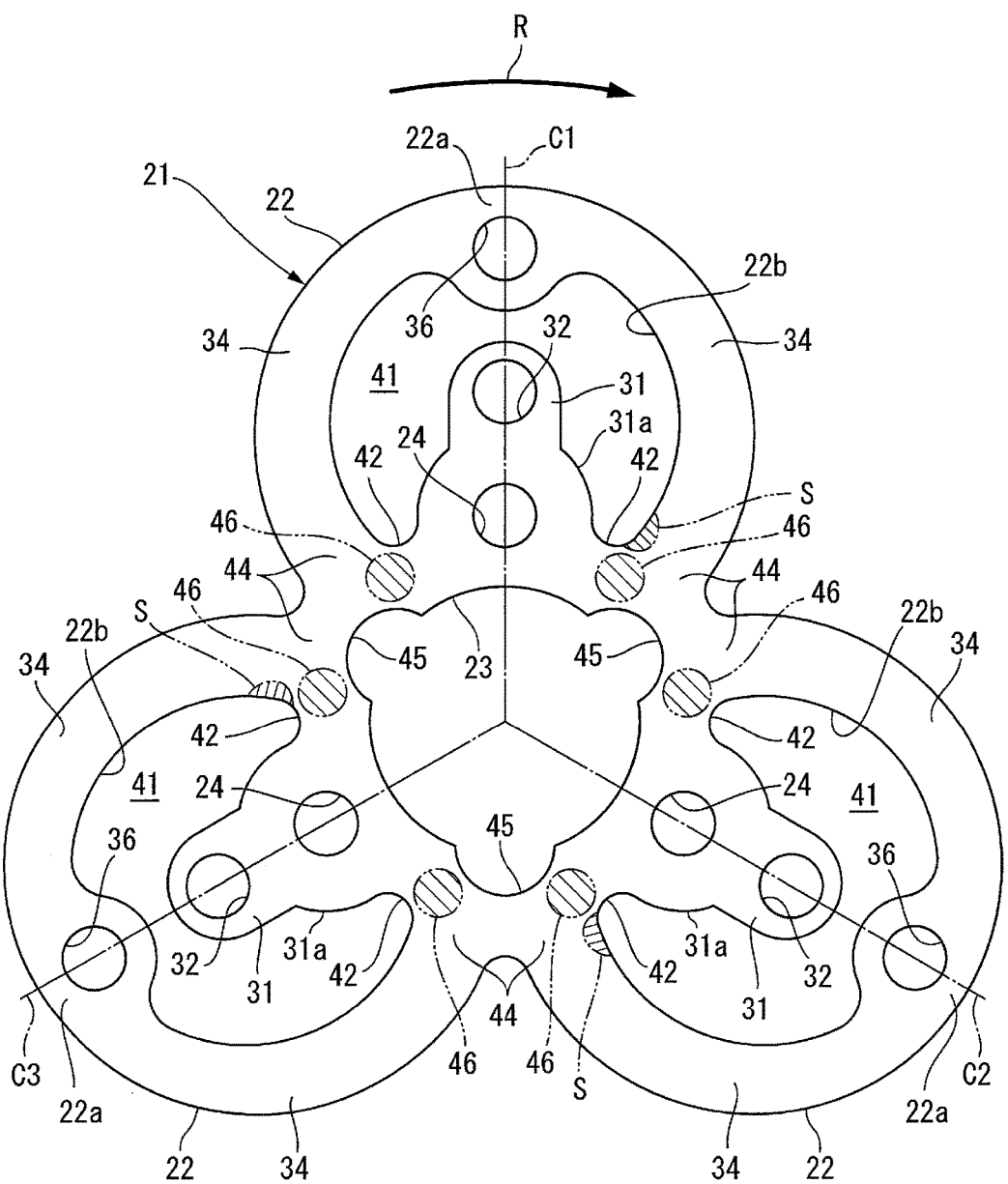
FIG. 3 is a front view of a leaf spring.

As shown in FIG. 3, three stoppers 31 projecting outside in the radiation direction from three portions arranged in the circumferential directions are integrated with the base portion 23. In this embodiment, the three stoppers 31 project outside in the radiation direction along the virtual central lines C1 to C3 from those portions, in which the through holes 24 are formed, of the outer circumferential portion of the base 23. As shown in FIGS. 1 and 2, the distal end portions of the stoppers 31 face the armature 8 in the axial direction of the rotating shaft 3. A through hole (see FIG. 3) is formed in the distal end portion of the stopper 31, and stopper rubber member 33 is fitted in the through hole 32. The stopper rubber member 33 regulates the movement of the armature 8 in a direction away from the rotor 2.

The connecting piece 22 of the leaf spring 21 is formed by a pair of connecting portions 34 positioned on the two sides of the stopper 31. The pair of connecting portions 34 are formed to be integrated with each other on the two sides of the stopper 31 in the outer circumferential portion of the base 23, and project outside in the radial direction from the base 23. Since the distal ends of the pair of connecting portions 34 are connected, the connecting piece 22 is formed into an annular shape surrounding the stopper 31. The distal ends of the pair of connecting portions 34, i.e., the projecting ends of the connecting portions 34 are equivalent to a free end portion 22a of the connecting piece 22. As shown in FIG. 1, the free end portion 22a is fixed to the armature 8 by a free-end-side rivet 35.

A through hole 36 is formed in the free end portion 22a. The free-end-side rivet 35 is inserted into the through hole 36. As shown in FIG. 2, the free-end-side rivet 35 is caulked as it is inserted into the through hole 36 formed in the connecting piece 22 and a through hole 37 formed in the armature 8, thereby connecting the connecting piece 22 and armature 8. In this embodiment, the free-end-side rivet 35 is "a second rivet" of the present invention.

The three free-end-side rivets 35 are arranged in positions where the above-described virtual central lines C1 to C3 and three free end portions 22a intersect each other. Therefore, the base-side rivet 18 for fixing the base 23 of the leaf spring 21 to the armature hub 15, the free-end-side rivet 35 for fixing the connecting piece 22 of the leaf spring 21 to the armature 8, and the stopper 31 are aligned in the radial direction of the base 23.

In a state in which the base 23 is fixed to the armature hub 15 by the base-side rivets 18, the connecting pieces 22 of the leaf spring 21 bias the armature 8 away from the rotor 2 in the axial direction. Accordingly, in a state in which the magnetism of the electromagnetic coil 14 does not act on the armature 8, as shown in FIG. 2, the spring force of the leaf spring 21 presses the armature 8 against the stopper rubber members 33. The height (the thickness in the axial direction) of the stopper rubber member 33 affects the preset load (the initial reaction of the connecting portions 34) of the leaf spring 21. The stopper rubber members 33 according to this embodiment set the preset load of the leaf spring 21 at a predetermined value.

The leaf spring 21 according to this embodiment is punched out of a plate-like leaf spring base material (not shown). By punching out a part of the leaf spring base material, a punched hole 41 is formed between the connecting piece 22 and the stopper 31 outside the base 23 in the radial direction. An inner circumferential edge 22b (see FIG. 3) of the connecting piece 22 and an outer edge 31a of the stopper 31 form the hole wall of the punched hole 41. Of this hole wall, as shown in FIG. 1, U-shaped recesses 42 extending from the pair of connecting portions 34 of the connecting piece 22 to the stopper 31 via the base 23 are formed in positions adjacent, in the rotational direction, to the base-side rivet 18, when viewed in the axial direction. When viewed in the axial direction of the rotating shaft 3, the bottoms (deepest portions) of the recesses 42 are formed in positions reaching outer circumferential edges 43 (the three sides of the triangle in this embodiment) of the flange 15b of the armature hub 15. Therefore, fixed ends of the connecting piece 22 formed by a cantilever spring, i.e., boundary portions 44 between the base 23 and the connecting portions 34 of the leaf spring 21 are formed in positions overlapping the outer circumferential edges 43 of the flange 15b, when viewed in the axial direction of the rotating shaft 3.

As shown in FIG. 3, three notches 45 are formed in the inner circumferential portion of the base 23 of the leaf spring 21. The notches 45 are formed into a semicircular shape extending outside in the radial direction from the inner circumferential edge of the base 23, in portions adjacent to and inside the above-described boundary portions 44 in the radiation direction. When viewed in the axial direction of the rotating shaft 3, the bottoms (deepest portions) of the notches 45 are formed in positions reaching the outer circumferential edges 43 of the flange 15b of the armature hub 15.

Since the notches 45 are thus formed in the base 23, low-strength portions 46 where the base 23 partially narrows are formed in those portions of the base 23, in which the connecting portions 34 are connected. Referring to FIGS. 1 and 3, the low-strength portions 46 are schematically indicated by alternate-long-and-two-short-dashed-line hatched circles. In this embodiment, the low-strength portion 46 is formed in the boundary portion 44 sandwiched between the notch 45 and the punched hole 41 described above. The length from the bottom of the U-shaped recess 42 to the bottom of the notch 45 in the low-strength portion 46 is shorter than the length from the bottom of the recess 42 to the through hole 24. This makes the strength of the low-strength portion 46 lower than that in the periphery of the through hole 24.

In a state in which the stopper rubber members 33 of the leaf spring 21 having the structure as described above are in contact with that surface of the armature 8, which is opposite to the rotor 2, the base 23 is fixed to the armature hub 15 by the base-side rivets 18, and the connecting pieces 22 are fixed to the armature 8 by the free-end-side rivets 35.

When electric power is supplied to the electromagnetic coil 14 in the electromagnetic clutch 1, as indicated by the alternate long and two short dashed line in FIG. 2, a magnetic flux Φ passes through the rotor 2 and armature 8, and the armature 8 is magnetically attracted by the rotor 2 against the spring force of the leaf spring 21. When the armature 8 is attracted by the rotor 2, the friction surface 8a of the armature 8 frictionally engages with the friction surface 2b of the rotating rotor 2, and the rotational force is transmitted from the connecting pieces 22 to the base 23 of the leaf spring 21. In this state, the connecting pieces 22 are strained. Note that the connecting pieces 22 are also strained when connected to the armature 8 by the free-end-side rivets 35. In this embodiment, the notches 45 are formed near the boundary portions 44 between the base 23 and the connecting portions 34, and the low-strength portions 46 deform and disperse the force. This decreases stress caused in the rivet caulked portions (around the through holes 24) of the base 23 by the strain of the connecting pieces 22.

In the connected state in which the armature 8 is attracted to the rotor 2, the rotation of the rotor 2 is transmitted to the rotating shaft 3 via the leaf spring 21 and armature hub 15. If the rotating shaft 3 on the driven side is locked by some cause in this connected state, an excess load is applied to the leaf spring 21. In this case, if, for example, the rotor 2 is rotating clockwise in FIG. 1 as indicated by an arrow R in FIG. 1, the pair of connecting portions 34 forming the connecting piece 22 are displaced to the downstream side in the rotational direction with respect to the stopper 31. Of the pair of connecting portions 34, one connecting portion 34 positioned downstream in the rotational direction elastically deforms in a direction in which the above-described U-shaped recess 42 expands. The other connecting portion 34 elastically deforms in a direction in which the U-shaped recess 42 narrows. In this state, the stress becomes maximum in the connecting portion between the recess 42 and the connecting portion 34 positioned downstream in the rotational direction, particularly, in a region S shown in FIG. 3.

If the deformation amount of the connecting portion 34 exceeds the limit, the stress concentrates from the region S of the leaf spring 21 to the low-strength portion 46 and cracks it, so the base 23 is broken in the low-strength portion 46. Since the base 23 is broken in the low-strength portions 46, the leaf spring 21 is divided into a plurality of parts. That is, the leaf spring 21 is divided into a part of the base 23 fixed to the armature hub 15, and the connecting portion 34 and a part of the base 23 fixed to the armature 8.

The stopper 31 is connected to the part of the base 23 fixed to the armature hub 15. Even when the leaf spring 21 is broken, therefore, the stopper 31 remains on the side of the armature hub 15. When power supply to the electromagnetic clutch 1 is stopped in this state in which the leaf spring 21 is broken, the armature 8 leaves the rotor 2 and abuts against the stopper rubber member 33. As a consequence, the stopper rubber member 33 prevents the armature 8 from falling outside the electromagnetic clutch 1. In this embodiment, therefore, even when an excess load is applied to the leaf spring 21 and the leaf spring 21 is broken, the armature 8 does not fall outside the electromagnetic clutch 1.

In this embodiment, the low-strength portion 46 is formed in that portion of the base 23, which is adjacent to the notch 45 of the leaf spring 21, and near the boundary portion 44 between the base 23 and the connecting portion 34. Accordingly, the low-strength portion 46 of the base 23 easily deforms when an external force (a strain or rotational force) is applied from the connecting portion 34 to the base 23, and this reduces stress occurring in the rivet caulking portion of the base 23. Since, therefore, the base 23 is hardly broken in the rivet caulking portion of the base 23, the stopper 31 easily remains, and this makes it possible to further reliably prevent the armature 8 from falling outside the electromagnetic clutch 1.

In the leaf spring 21 according to this embodiment, the pair of connecting portions 34 positioned on the two sides of the stopper 31 form the annular connecting piece 22 surrounding the stopper 31. The base-side rivet 18 for fixing the base 23 of the leaf spring 21 to the armature hub 15, the free-end-side rivet 35 for fixing the connecting piece 22 to the armature 8, and the stopper 31 are aligned in the radiation direction of the base 23. Therefore, the connecting piece 22 can be formed to be axially symmetrical with respect to a corresponding one of the above-described virtual central lines C1 to C3. Consequently, the electromagnetic clutch 1 which is not restricted in rotational direction can be provided.

Figure 4:
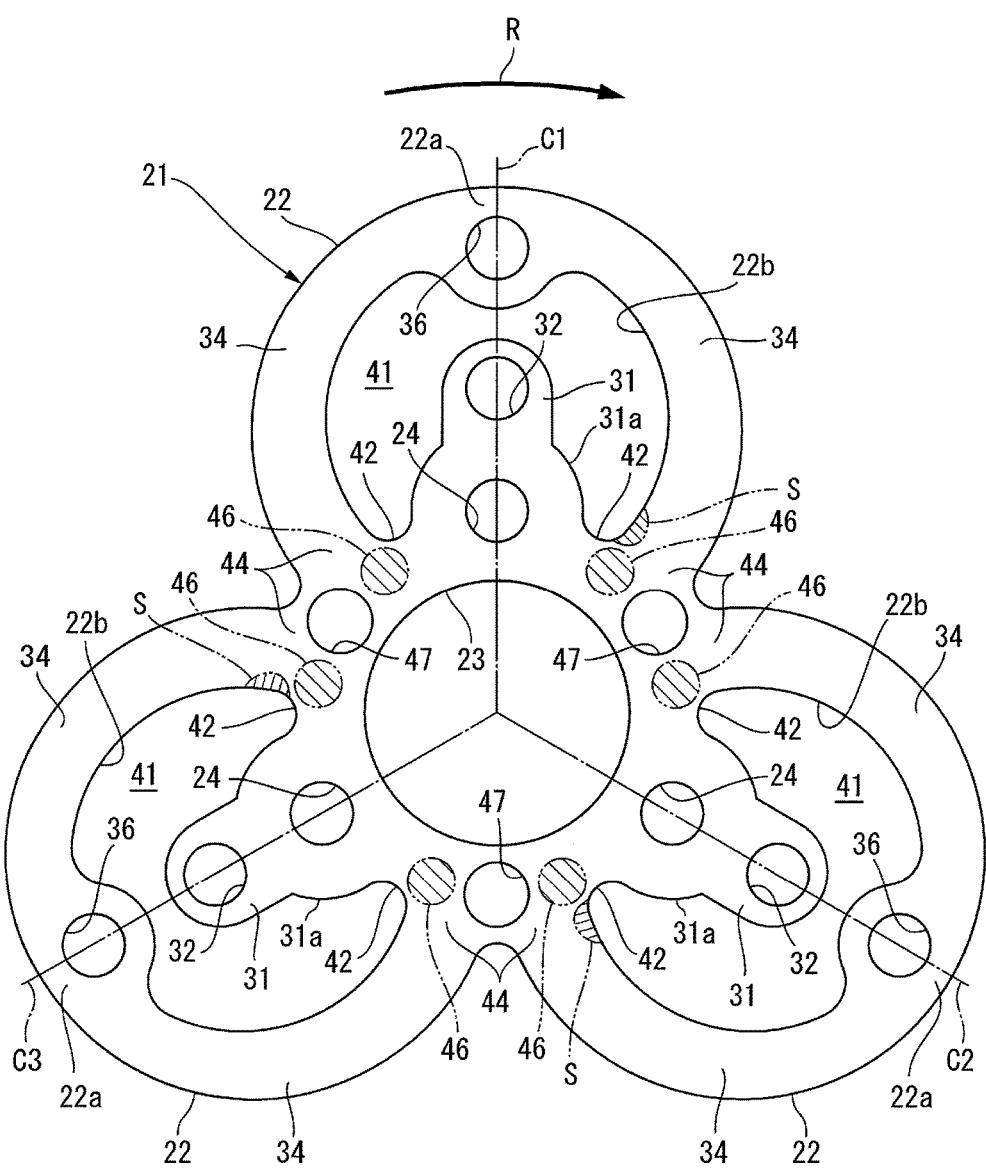
FIG. 4 is a front view of another example of the leaf spring.

In this embodiment, the low-strength portions 45 are formed by forming the semicircular notches 45 in the inner circumferential portion of the base 23. However, the shape of the notch 45 is not limited to a semicircular shape, and can appropriately be changed. Also, the low-strength portion 46 can be formed by only reducing the area of that portion of the base 23, which connects adjacent connecting pieces 22. As shown in FIG. 4, therefore, the low-strength portion 46 can also be formed by forming a through hole 47 in that portion of the base 23, which connects adjacent connecting pieces 22.

In addition, the flange 15b of the armature hub 15 has an almost triangular shape, but may also have rounded corners as shown in FIG. 1. Furthermore, the outer circumferential edge 43 of the flange 15b need not be straight, and may also be an arc having a curvature different from that of the arc of the corner.

The example in which the three connecting pieces 22, three stoppers 31, three notches 45, three base-side rivets 18, and three free-end-side rivets 35 are formed has been explained above. However, the number of these elements need only be two or more. More specifically, in a car air-conditioner electromagnetic clutch like this embodiment, three or four connecting pieces 22 and the like are formed. Also, in an electromagnetic clutch for general industries, five connecting pieces 22 and the like are formed in some cases.

What is claimed is:

1. An electromagnetic clutch comprising:
   a first rotary member formed of a magnetic material;
   a second rotary member arranged in an axial portion of the first rotary member, and rotatable with respect to the first rotary member;
   an armature hub including a boss formed on one end portion of the second rotary member in an axial direction, and a flange extending outside in a radial direction from the boss;
   an armature formed into an annular shape including a hollow portion having a diameter larger than an outer diameter of the flange, and arranged in a position facing one end portion of the first rotary member in the axial direction, the flange being inserted into the hollow portion;
   a leaf spring configured to connect the armature to the flange, and bias the armature away from the first rotary member by a spring force;
   an electromagnetic coil configured to generate a magnetic flux, and magnetically attract the armature to the first rotary member against the spring force of the leaf spring;
   a first rivet configured to fix the leaf spring to the flange; and
   a second rivet configured to fix the leaf spring to the armature,
   wherein the leaf spring includes
   a base formed into an annular shape, positioned on the same axis as that of the second rotary member, and overlaid on and fixed to the flange,
   a first through hole which is formed in the base, and into which the first rivet is inserted,
   a stopper projecting outside in the radial direction from a portion, in which the first through hole is formed, of an outer circumferential portion of the base and facing the armature in the axial direction,
   a connecting piece including a pair of connecting portions projecting outside in the radial direction from two sides of the stopper on an outer circumferential portion of the base, and having distal ends connected to each other,
   a second through hole which is formed in a projecting end of the connecting piece, and into which the second rivet is inserted,
   a punched hole formed between the connecting piece and the stopper outside the base in the radial direction, and
   a low-strength portion formed in a boundary portion between the base and the connecting portion and having strength lower than that in a periphery of the first through hole, the boundary portion overlapping an outer circumferential edge of the flange when viewed in an axial direction of the second rotary member.

2. The clutch according to claim 1, wherein
the leaf spring further includes a notch formed in a portion adjacent to and inside the boundary portion in the radial direction, and extending outside in the radial direction from an inner circumferential edge of the base, and
the low-strength portion is sandwiched between the notch and the punched hole.

3. The clutch according to claim 2, wherein
the punched hole includes U-shaped recesses extending from the pair of connecting portions to the stopper via the base, when viewed in the axial direction of the second rotary member, and
a bottom of the U-shaped recess reaches the outer circumferential edge of the flange, when viewed in the axial direction of the second rotary member.

4. The clutch according to claim 2, wherein
the notch is formed into a semicircular shape extending outside in the radial direction from an inner circumferential edge of the base, and
a bottom of the notch reaches the outer circumferential edge of the flange, when viewed in the axial direction of the second rotary member.

* * * * *